United States Patent
Wang et al.

(10) Patent No.: US 10,696,175 B2
(45) Date of Patent: Jun. 30, 2020

(54) VARIABLE INVERTER OUTPUT

(71) Applicant: Ford Global Technologies, LLC, Dearborn, MI (US)

(72) Inventors: Jiyao Wang, Canton, MI (US); Wei Xu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/679,006

(22) Filed: Aug. 16, 2017

(65) Prior Publication Data

US 2019/0054840 A1 Feb. 21, 2019

(51) Int. Cl.
| | |
|---|---|
| B60L 15/00 | (2006.01) |
| H02K 3/28 | (2006.01) |
| H02M 1/32 | (2007.01) |
| H02P 27/08 | (2006.01) |
| H02P 29/68 | (2016.01) |
| H02P 25/22 | (2006.01) |

(52) U.S. Cl.
CPC ............ *B60L 15/007* (2013.01); *H02P 25/22* (2013.01); *H02P 27/08* (2013.01); *H02P 29/68* (2016.02); *B60L 2240/423* (2013.01); *B60L 2240/525* (2013.01)

(58) Field of Classification Search
CPC ........... H02K 3/28; B60L 15/007; H02M 1/32
See application file for complete search history.

(56) References Cited

U.S. PATENT DOCUMENTS

| | | | |
|---|---|---|---|
| 5,365,153 A | 11/1994 | Fujita | |
| 7,009,856 B2 | 3/2006 | Moon et al. | |
| 7,687,929 B2 | 3/2010 | Fattal | |
| 9,063,202 B2 | 6/2015 | Hendrickson et al. | |
| 9,071,181 B2 | 6/2015 | Yersin | |
| 9,399,407 B2 | 7/2016 | Zhou et al. | |
| 9,748,887 B2 | 9/2017 | Notohara et al. | |
| 9,923,504 B2 | 3/2018 | Mori | |
| 2011/0101906 A1* | 5/2011 | Tagome | ............ H02K 3/28 318/722 |
| 2013/0285591 A1 | 10/2013 | Suzuki | |
| 2015/0084570 A1* | 3/2015 | Hara | ............ B62D 5/0403 318/494 |
| 2015/0354870 A1* | 12/2015 | Lee | ............ F24F 11/30 62/498 |

(Continued)

OTHER PUBLICATIONS

Kwang-Woon Lee et al., Evaluation of Back-EMF Estimators for Sensorless Control of Permanent Magnet Synchronous Motors, Journal of Power Electronics, vol. 12, No. 4, Jul. 2012, 11 pgs.

(Continued)

*Primary Examiner* — Cortez M Cook
(74) *Attorney, Agent, or Firm* — Dave Kelley; Brooks Kushman PC

(57) ABSTRACT

A vehicle includes an electric machine. The vehicle includes a controller configured to repeatedly adjust power outputs for the two inverters so that they differ to drive the difference toward zero and such that power provided to the electric machine satisfies demand until the difference falls below a second predetermined threshold. The controller may be configured to adjust responsive to a temperature difference between two inverters associated with the electric machine exceeding a predetermined threshold.

14 Claims, 3 Drawing Sheets

(56) References Cited

U.S. PATENT DOCUMENTS

2016/0043670 A1* 2/2016 Nakamura ............ H02P 27/085
                                                           318/400.17
2017/0019048 A1   1/2017 Furukawa
2018/0006547 A1   1/2018 Mori

OTHER PUBLICATIONS

Final Office Action for U.S. Appl. No. 15/10,501 dated Jan. 24, 2020; 16 pages.

* cited by examiner

VARIABLE INVERTER OUTPUT

TECHNICAL FIELD

This disclosure relates to variable inverter output.

BACKGROUND

Inverters are used to operate electric machines. Some electric machines may be operated by more than one inverter to reduce inefficiencies associated with high output single inverters. Because of physical placement of the inverters within vehicles or other factors, the wear and use of each inverter may be unequal.

SUMMARY

A vehicle includes an electric machine. The vehicle includes a controller configured to repeatedly adjust power outputs for the two inverters so that they differ to drive the difference toward zero and such that power provided to the electric machine satisfies demand until the difference falls below a second predetermined threshold. The controller may be configured to adjust responsive to a temperature difference between two inverters associated with the electric machine exceeding a predetermined threshold.

A vehicle includes two inverters configured to drive an electric machine. The vehicle includes a controller configured to shutdown a one of the two inverters such that power supplied to the electric machine by the other of the inverters satisfies demand. The shutdown is responsive to a power demand falling below a maximum threshold.

A vehicle includes an electric machine. The vehicle includes two inverters configured to drive the electric machine. The vehicle includes a controller configured to reduce power output for one of the two inverters and raise power output for the other of the two inverters such that power provided to the electric machine satisfies demand. The controller is configured to reduce power responsive to a difference between aggregated operational factors for each of the two inverters exceeding a predetermined threshold.

DETAILED DESCRIPTION

Figure 1:
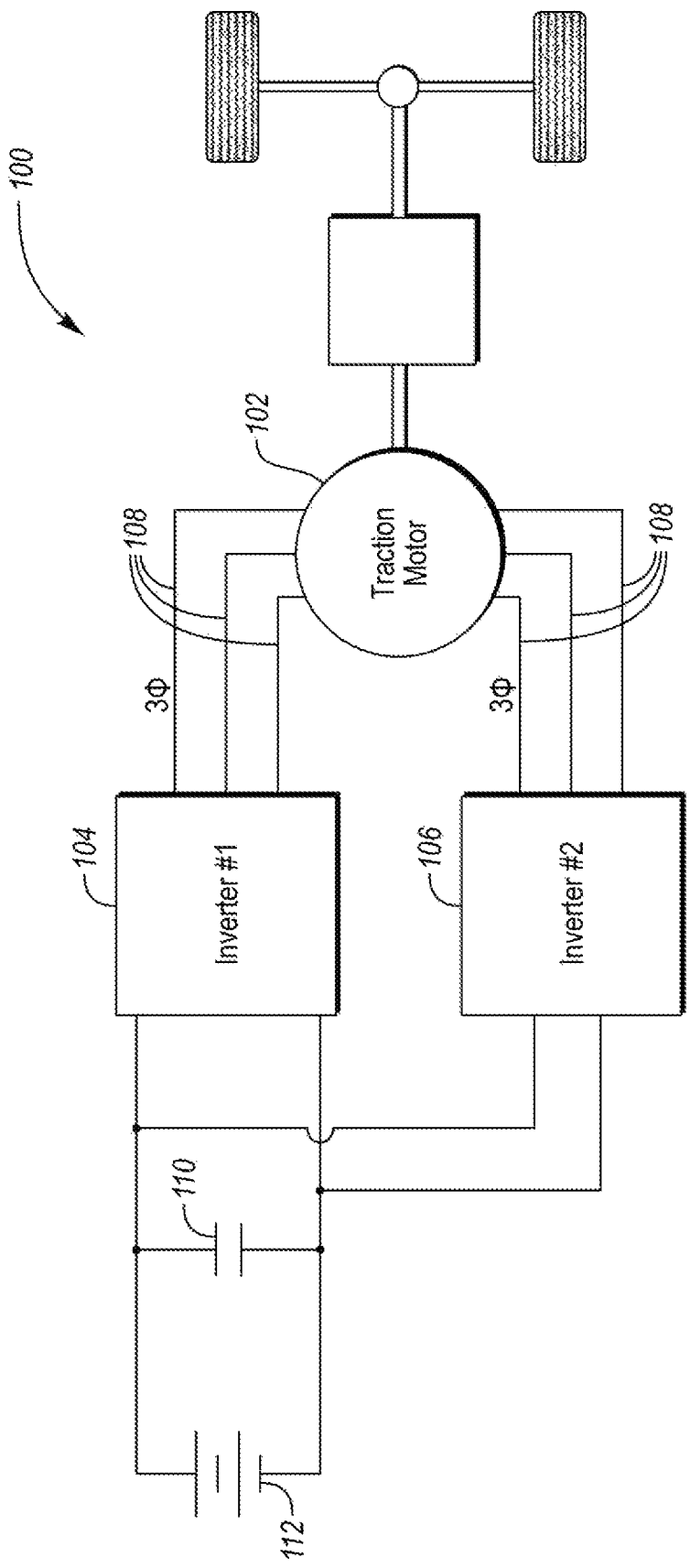
FIG. 1 is a schematic overview of a vehicle.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electric machines may be associated more than one inverter to convert alternating current of the electric machine to direct current for operation. Multiple inverters may be wired to operate the electric machine using multiple leads organized on the same or similar phases. As an example, an electric machine may have six leads—having three from each inverter—and operate on three phases. A power demand may be provided by an autonomous or human source and send to the gate driver of the inverter to operate the inverters. According to this disclosure, the inverters may be differentially operated such that different portions of the total power operating the electric machine is used by each of the inverters to supply the demand.

The controller may determine which inverter use by assessing a variety of operational factors. For example, the inverter may look at a temperature difference between the inverters. The temperature difference may be ambient as well. Inverters in higher temperatures may have reduced efficiency and longevity. The controller may be configured to alter the disparity of each inverters power output based on the temperature difference. The controller may be configured to shutdown the one of the two inverters when the temperature of one of the inverters exceeds a predetermined threshold. The controller may operate the other of the two inverters to provide power to meet demand.

The controller may reduce the power output by adjusting a pulse width modulation signal sent to gates of the one of the two inverters. A modulation index of one of the inverters may be adjusted to alter the power output. An acceleration pedal or other user input device may provide the demand. In other embodiments, an autonomous vehicle controller may provide the input.

The controller may also be configured to shut down one of the inverters when only one inverter is necessary to supply the power demand. The shutdown saves the running time of the inverter and can extend the life of inverter system overall by using the least used inverters only, instead of all of the inverters. This determination may be based on operation factors such as average temperature during operation or the amount of time an inverter has been operated. The operational factors may also include other environmental or climate conditions (e.g., humidity, radiation). The controller may be configured to aggregate the operation factors over time to select an inverter for shutdown. The aggregated values may be stored in a table or data store for retrieval upon request.

Referring to FIG. 1, a portion of a vehicle 100 is shown. The vehicle includes a traction motor or electric machine 102. More than one electric machine 102 may be used. The electric machine 102 may be connected to a drivetrain that includes a transmission and wheels. The electric machine 102 as shown is a six-lead, three-phase electric machine 102. The electric machine 102 is operated by a pair of three-phase inverters 104, 106. Each phase 108 has its own lead to operate the electric machine 102. As discussed above, any number of inverters may be used and the use of three phases is not required. The inverters 102 may be powered by the same or independent DC busses that include a direct current source 112. The DC bus may include a DC link capacitor 110.

Figure 2:
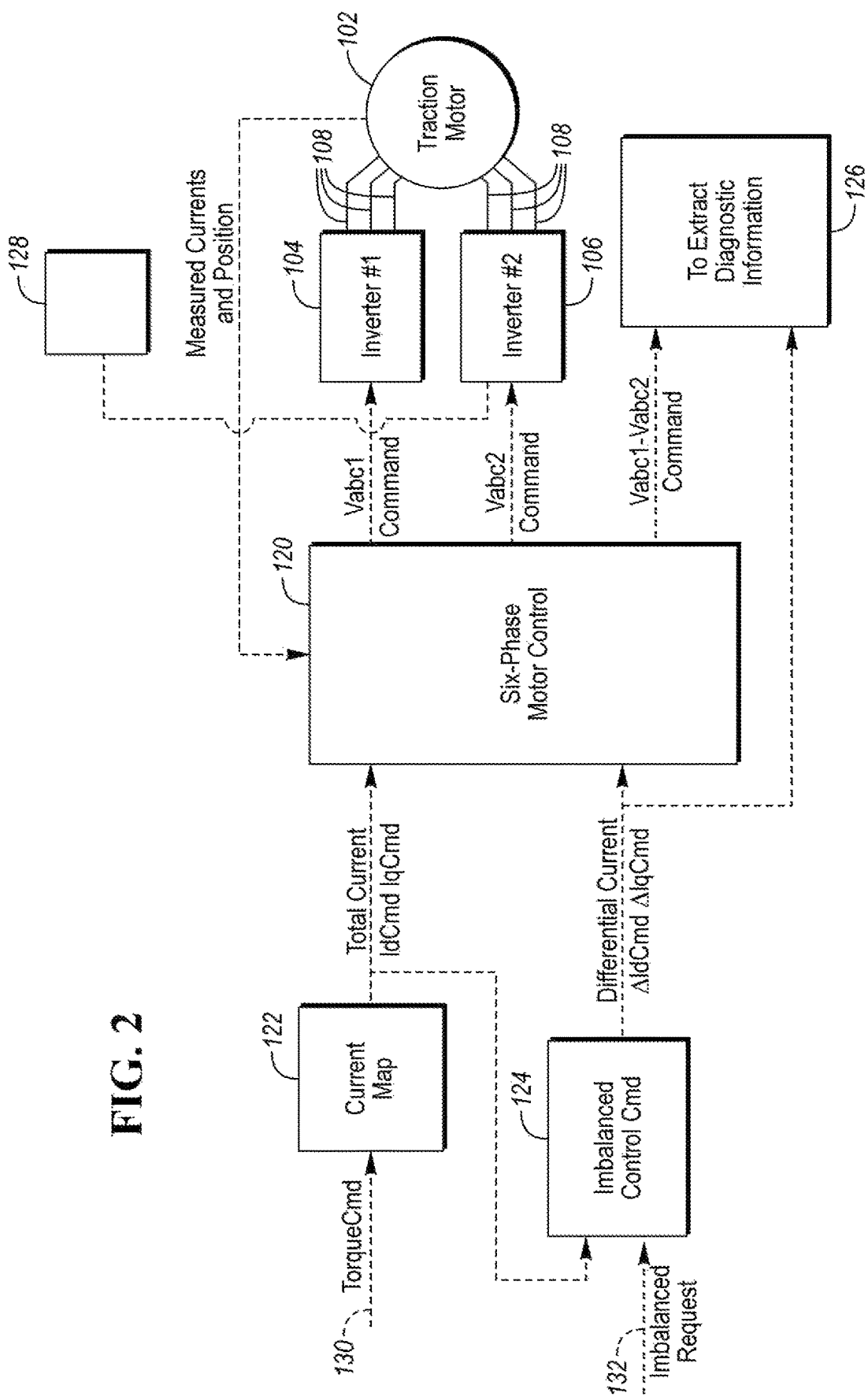
FIG. 2 is a functional diagram of an electrical drive system controller.

Referring to FIG. 2, a torque command 130 is provided from a torque demand or input. The torque demand or input may be from an operator or autonomous input. The torque command is fed into the current map 122 function block to determine the current demand based on pre-calibrated current maps. The electric machine 102 delivers the desired torque when its phase currents match the current command. The total current demand is sent to the six-phase motor control 120 function block and the imbalanced control command 124 function block. The imbalanced control command 124 function block also receives an imbalanced request 132, which may be from another controller that evaluates climate or use conditions for each of the inverters 104, 106. The imbalanced control command 124 function block sends a differential current command to the six-phase motor control 120 function block. The six-phase motor control 120 function block receives the current command and outputs corresponding voltage commands, in pulse width modulation (PWM) signals to achieve desired motor current for each phase. The six-phase motor control 120 function block includes closed-loop current regulation to match the actual current to the current commands, which includes the total current and differential current commands. The PWM signals are sent to gates of the inverters 104, 106 to generate corresponding three phase current 108 to the electric machine 102. The differential current command and differential PWM signals may be used to extract diagnostic information 126 from the electric machine 102.

The imbalanced control command 124 function block may receive an imbalanced request 132 based on a variety of factors. For example, the imbalanced request 132 could be based on different physical locations, an inverter mismatch, a motor winding mismatch, temperature differences. The controller 128 may be configured to switch between the inverters 104, 106 in an organized fashion to disburse the use of the inverters 104, 106. For example, the inverters may be configured to run on for 10 hours and then off for 10 hours when the current command 130 can be fulfilled by only one of the inverters 104, 106.

Figure 3:
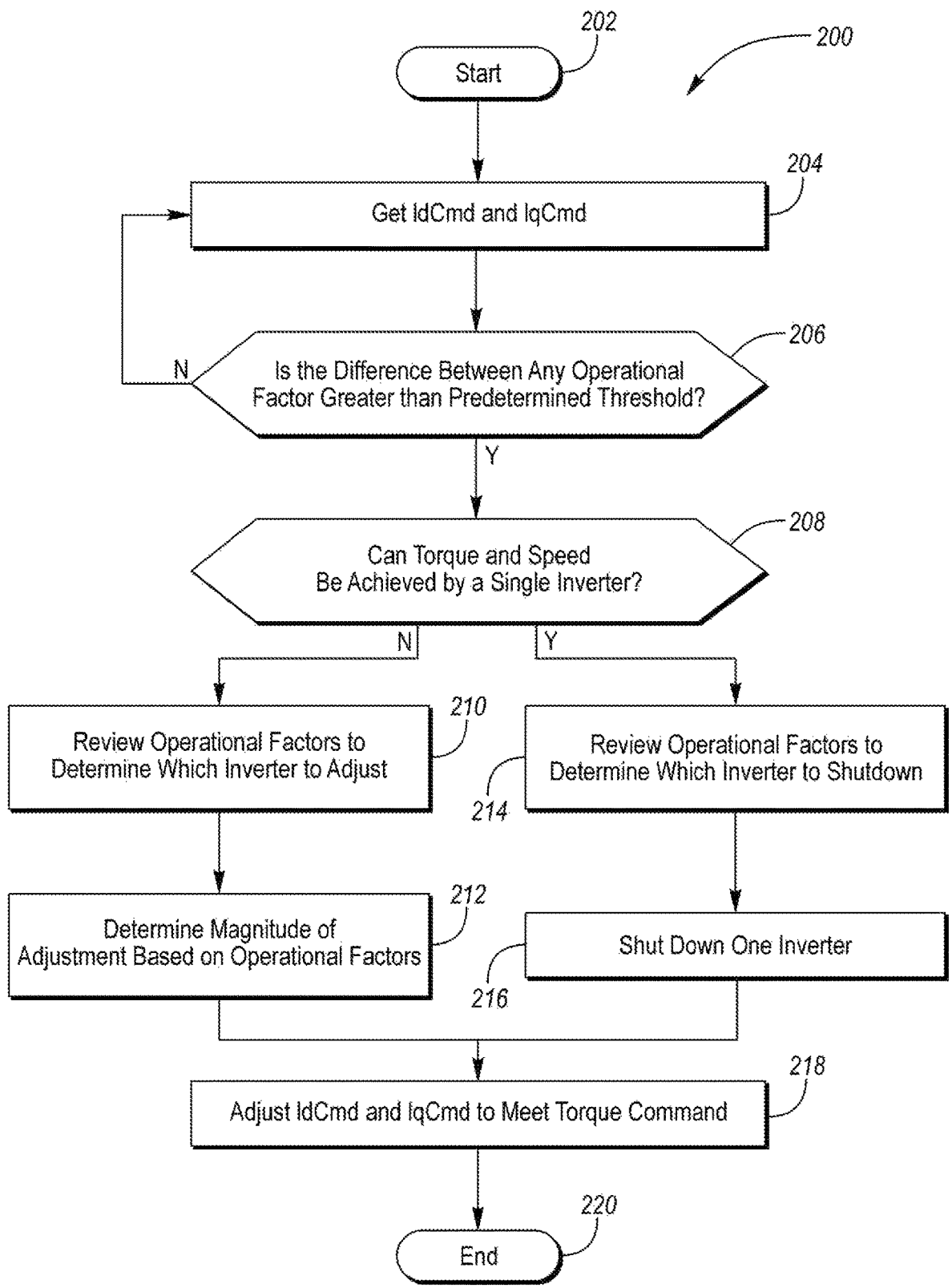
FIG. 3 is an algorithm for selecting inverter output power.

Referring to FIG. 3, an algorithm 200 for determining a differential torque command is shown. The algorithm 200 starts in step 202. In step 204, the controller 128 determines whether the difference between an operational factor is greater than a predetermined threshold. For example, the controller 128 may determine whether the temperature difference between the two inverters 104, 106 is greater than 5° C. If the difference is greater than the predetermined threshold, the controller 128 may determine whether the torque and speed can be achieved by a single inverter to bifurcate the output of the algorithm. If the torque and speed cannot be achieved by a single inverter in step 208, the controller 128 may review operational factors (e.g., temperature, climate, run time) to determine which inverter 104, 106 to adjust in step 210. The controller 128 may determine the magnitude of the adjustment based on the operational factors 212. For example, the controller 128 may decrease the usage of one inverter by a greater amount based on the magnitude of the temperature difference. In step 218, the current commands are adjusted to meet the torque command. If the torque and speed can be achieved by a single inverter in step 208, the controller 128 may review operation factors to determine which inverter 104, 106 to shut down in step 214. For example, the controller 128 may shut down the inverter with the highest temperature or longest run time in step 216. In step 218, the current commands are adjusted to ensure the torque and speed requirements are met. In step 220, the process ends.

It should be appreciated that any number of controllers may perform the teachings and algorithms disclosed in this disclosure. One controller may perform all of the functions disclosed, or a combination of controllers may cooperate to ensure the functions are completed. The controllers may be embedded and include associated memory and other processing capabilitites. Any type of controller, processor, or computational architecture may be used.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   an electric machine; and
   a controller configured to, responsive to receiving a signal that is indicative of a temperature difference between two inverters associated with the electric machine exceeding a predetermined threshold, adjust power outputs for the two inverters to reduce power output for one of the two inverters and raise power output for the other of the two inverters such that power provided to the electric machine satisfies demand.

2. The vehicle of claim 1, wherein a change in power output of the two inverters is based on the difference.

3. The vehicle of claim 2, wherein the change is proportional to the difference.

4. The vehicle of claim 2, wherein the controller is further configured to, responsive to the difference rising above a maximum threshold, shutdown the one of the two inverters.

5. The vehicle of claim 4, wherein the controller is further configured to operate the other of the two inverters to provide power to meet demand.

6. The vehicle of claim 1, wherein reducing the power output includes adjusting a pulse width modulation signal sent to gates of the one of the two inverters.

7. The vehicle of claim 1, wherein reducing the power output includes adjusting a modulation index of the one of the two inverters.

8. The vehicle of claim 1, wherein the demand is provided by a user input device.

9. The vehicle of claim 1, wherein the electric machine has six leads and three phases.

10. A vehicle comprising:
    an electric machine;
    two inverters configured to drive the electric machine; and
    a controller configured to, responsive to receiving a signal that is indicative of a difference between aggregated operational factors for each of the two inverters exceeding a predetermined threshold, reduce power output for one of the two inverters and raise power output for the other of the two inverters such that power provided to the electric machine satisfies demand.

11. The vehicle of claim 10, wherein the aggregated operational factors include time.

12. The vehicle of claim 11, wherein the aggregated operational factors include climate over time.

13. The vehicle of claim 12, wherein the climate includes temperature.

14. The vehicle of claim 13, wherein the one inverter has a temperature greater than the other inverter.

* * * * *